United States Patent
Sun et al.

(10) Patent No.: US 10,204,407 B2
(45) Date of Patent: Feb. 12, 2019

(54) MEASUREMENT METHOD AND MEASUREMENT DEVICE OF CRITICAL DIMENSION OF SUB-PIXEL

(71) Applicants: BOE Technology Group Co., Ltd., Beijing (CN); Beijing BOE Display Technology Co., Ltd., Beijing (CN)

(72) Inventors: Zhiyi Sun, Beijing (CN); Huashan Pang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/207,598

(22) Filed: Jul. 12, 2016

(65) Prior Publication Data

US 2017/0193653 A1    Jul. 6, 2017

(30) Foreign Application Priority Data

Jan. 4, 2016    (CN) .......................... 2016 1 0005536

(51) Int. Cl.
*G06K 9/00* (2006.01)
*G06T 7/00* (2017.01)

(52) U.S. Cl.
CPC ............ *G06T 7/0006* (2013.01); *G06T 7/001* (2013.01); *G06T 7/0004* (2013.01); *G06T 2207/10024* (2013.01); *G06T 2207/30121* (2013.01)

(58) Field of Classification Search
CPC .................. G06T 7/0006; G06T 7/001; G06T 2207/10024; G06T 7/0008; G06T 7/0004
See application file for complete search history.

(56) References Cited

U.S. PATENT DOCUMENTS

| 7,200,259 B1* | 4/2007 | Gold ................... G06K 9/0014 382/149 |
| 2002/0186189 A1* | 12/2002 | Ilcisin .................. G02F 1/1309 345/87 |

(Continued)

FOREIGN PATENT DOCUMENTS

| CN | 101277369 A | 10/2008 |
| CN | 102737377 A | 10/2012 |

(Continued)

OTHER PUBLICATIONS

First Office Action from Chinese Patent Application No. 201610005536.1, dated Nov. 3, 2017, 15 pages.

(Continued)

*Primary Examiner* — Samir A Ahmed
(74) *Attorney, Agent, or Firm* — Westman, Champlin & Koehler, P.A.

(57) ABSTRACT

The disclosure discloses a method for measuring a critical dimension of a sub-pixel and a device. The method for measuring the critical dimension of the sub-pixel comprises: scanning an image of a pixel unit of a display substrate and obtaining a gray information on the image; acquiring a margin position of a sub-pixel unit to be measured based on the gray information on the image; acquiring a chromatic value at the margin position of the sub-pixel unit to be measured and determining whether the margin position of the sub-pixel unit to be measured is correct based on the chromatic value at the margin position of the sub-pixel unit to be measured; obtaining the critical dimension of the sub-pixel unit to be measured based on the margin position of the sub-pixel unit to be measured if it is determined that the margin position of the sub-pixel unit to be measured is correct; reacquiring the margin position of the sub-pixel unit to be measured based on the gray information on the image until the reacquired margin position of the sub-pixel unit to (Continued)

be measured is determined to be correct if it is determined that the margin position of the sub-pixel unit to be measured is not correct. The method for measuring the critical dimension of the sub-pixel of the disclosure can improve accuracy of measuring the critical dimension of the sub-pixel.

10 Claims, 2 Drawing Sheets

(56) References Cited

U.S. PATENT DOCUMENTS

| | | | |
|---|---|---|---|
| 2003/0001997 A1* | 1/2003 | Ilcisin | G02F 1/133345 349/122 |
| 2008/0001865 A1* | 1/2008 | Kim | G09G 3/3216 345/84 |
| 2008/0239352 A1 | 10/2008 | Jun | |
| 2013/0003008 A1* | 1/2013 | Okumoto | G02F 1/133514 349/155 |
| 2014/0153002 A1* | 6/2014 | Park | G09G 3/006 356/625 |
| 2015/0187078 A1 | 7/2015 | Matsumoto | |

FOREIGN PATENT DOCUMENTS

| | | |
|---|---|---|
| CN | 104809800 A | 7/2015 |
| CN | 104899888 A | 9/2015 |
| JP | 2015123157 A | 7/2015 |
| WO | 2013080278 A1 | 6/2013 |

OTHER PUBLICATIONS

Yao et al. "Measurement Algorithm for Sub-pixel Line Width in Images Based on Zernike Moment" Optical Technique, Chinese Academic Journal, vol. 38, No. 6, Nov. 2012, 5 pages.

Second Office Action from Chinese Patent Application No. 201610005536.1, dated May 29, 2018, 15 pages.

* cited by examiner

MEASUREMENT METHOD AND MEASUREMENT DEVICE OF CRITICAL DIMENSION OF SUB-PIXEL

CROSS-REFERENCE TO RELATED APPLICATION

This application claims the benefit of Chinese Patent Application No. CN20160005536.1 filed on Jan. 4, 2016 in the State Intellectual Property Office of China, the whole disclosure of which is incorporated herein by reference.

BACKGROUND OF THE INVENTION

Field of the Invention

Embodiments of the disclosure generally relate to field of display technique, in particularly to a measurement method and a measurement device for a critical dimension of a sub-pixel unit.

Description of the Related Art

In a pixel of a color filter substrate, a critical dimension (CD) of each sub-pixel unit (red sub-pixel unit R, green sub-pixel unit G and blue sub-pixel unit B) is a key characteristic value to be monitored. A traditional method for measuring the critical dimension of the sub-pixel unit comprises scanning an image in a region of the sub-pixel unit to be measured on the color filter substrate; determining a margin position of the sub-pixel unit to be measured according to a change in gray value of the image, and then acquiring the critical dimension of the sub-pixel unit to be measured through further performing a calculation on the determined margin position. In the above method, since a scanning region typically has a plurality of sub-pixel units and the change in the gray value at the margin position of each sub-pixel is relatively similar to each other, it is easy to occur mistakes when determining the margin position of the sub-pixel unit to be measured, and the margin positions of other sub-pixel units adjacent to the sub-pixel unit are generally determined as the margin position of the sub-pixel unit to be measured. Therefore, the margin position of the sub-pixel unit to be measured determined according to the change in gray value of the region of the sub-pixel unit is often incorrect, causing the final determined critical dimension (CD) of the sub-pixel unit to be measured to be incorrect.

SUMMARY OF THE INVENTION

According to embodiments of the disclosure, there is provided a measurement method and a measurement device for a critical dimension of a sub-pixel unit which can improve accuracy of measuring the critical dimension of the sub-pixel.

According to one aspect of the disclosure, there is provided a method for measuring a critical dimension of a sub-pixel comprising:

scanning an image of a pixel unit of a display substrate and obtaining a gray information on the image;

acquiring a margin position of a sub-pixel unit to be measured based on the gray information on the image;

acquiring a chromatic value at the margin position of the sub-pixel unit to be measured and determining whether the margin position of the sub-pixel unit to be measured is correct based on the chromatic value at the margin position of the sub-pixel unit to be measured;

obtaining the critical dimension of the sub-pixel unit to be measured based on the margin position of the sub-pixel unit to be measured if it is determined that the margin position of the sub-pixel unit to be measured is correct;

reacquiring the margin position of the sub-pixel unit to be measured based on the gray information on the image until the reacquired margin position of the sub-pixel unit to be measured is determined to be correct if it is determined that the margin position of the sub-pixel unit to be measured is not correct, and then obtaining the critical dimension of the sub-pixel unit to be measured based on the margin position of the sub-pixel unit to be measured which is determined to be correct.

A method for measuring a critical dimension of a pixel unit of a color filter according to an exemplary embodiment of the disclosure comprises: firstly acquiring a margin position of a sub-pixel to be measured in a display substrate based on a gray information on an image within a region of the sub-pixel, then determining whether the margin position of the sub-pixel unit to be measured is correct through analyzing a chromatic value at the margin position of the sub-pixel unit to be measured, i.e., determining whether the margin position is a margin position of the pixel unit as an original measured target or not; if it is determined that the margin position is the margin position of the pixel unit as the original measured target, calculating the critical dimension of the sub-pixel unit to be measured based on the margin position; if it is determined that the margin position is not the margin position of the pixel unit as the original measured target, re-determining the margin position of the sub-pixel to be measured based on the gray information and this acquired margin position.

Compared with the traditional method for calculating the critical dimension of the sub-pixel unit to be measured by directly using the margin position of the sub-pixel unit to be measured after acquiring the margin position based on the gray information, the method for measuring the critical dimension of the pixel unit of the color filter based on the disclosure increases the step of determining the acquired margin position, and only when the determining result is YES, this margin position can be used to calculate the critical dimension of the sub-pixel unit to be measured. Therefore, the critical dimension of the sub-pixel unit to be measured obtained by the method for measuring the critical dimension of the pixel unit of the color filter according to the disclosure is more accurate. Thus, the method for measuring the critical dimension can improve accuracy for measuring the critical dimension of the pixel unit.

In an exemplary embodiment of the disclosure, the reacquiring the margin position of the sub-pixel unit to be measured based on the gray information on the image comprises reacquiring the margin position of the sub-pixel to be measured in a region between the previous acquired margin position of the sub-pixel to be measured and the sub-pixel to be measured based on the gray information on the image.

In an exemplary embodiment of the disclosure, the determining whether the margin position of the sub-pixel unit to be measured is correct based on the chromatic value at the margin position of the sub-pixel unit to be measured comprises: comparing the chromatic value at the margin position of the sub-pixel unit to be measured with a predetermined chromatic value range; determining the margin position of the sub-pixel unit to be measured is correct if the chromatic value at the margin position of the sub-pixel unit to be measured is within the predetermined chromatic value range; determining the margin position of the sub-pixel unit to be measured is not correct if the chromatic value at the margin position of the sub-pixel unit to be measured is out of the predetermined chromatic value range.

In an exemplary embodiment of the disclosure, the predetermined chromatic value range includes the chromatic value of the sub-pixel unit to be measured.

In an exemplary embodiment of the disclosure, the gray information on the image is a corresponding relation between a gray value and a position coordinate of the image.

In an exemplary embodiment of the disclosure, the obtaining the critical dimension of the sub-pixel unit to be measured based on the margin position of the sub-pixel unit to be measured comprises calculating a distance between margin positions of opposite margins of the sub-pixel to be measured, wherein a length of the distance is the critical dimension of the sub-pixel to be measured.

According to another aspect of the disclosure, there is provided a measurement device for a critical dimension of a sub-pixel comprising: an image scanner configured to scan an image of a pixel unit of a display substrate and obtain a gray information on the image; and a processor configured to: acquire a margin position of the sub-pixel unit to be measured based on the gray information on the image; acquire a chromatic value at the margin position of the sub-pixel unit to be measured and determine whether the margin position of the sub-pixel unit to be measured is correct based on the chromatic value at the margin position of the sub-pixel unit to be measured; obtain the critical dimension of the sub-pixel unit to be measured based on the margin position of the sub-pixel unit to be measured if it is determined that the margin position of the sub-pixel unit to be measured is correct; reacquire the margin position of the sub-pixel unit to be measured based on the gray information on the image until the reacquired margin position of the sub-pixel unit to be measured is determined to be correct if it is determined that the margin position of the sub-pixel unit to be measured is not correct, and then obtaining the critical dimension of the sub-pixel unit to be measured based on the margin position of the sub-pixel unit to be measured which is determined to be correct.

In an exemplary embodiment of the disclosure, the processor is configured to reacquire the margin position of the sub-pixel to be measured in a region between the previous acquired margin position of the sub-pixel to be measured and the sub-pixel to be measured based on the gray information on the image until the reacquired margin position of the sub-pixel unit is determined to be correct if it is determined that the margin position of the sub-pixel to be measured is not correct.

In an exemplary embodiment of the disclosure, the processor is configured to: compare the chromatic value at the margin position of the sub-pixel unit to be measured with a predetermined chromatic value range; obtain the critical dimension of the sub-pixel to be measured based on the margin position of the sub-pixel to be measured if the chromatic value at the margin position of the sub-pixel unit to be measured is within a predetermined chromatic value range; and reacquire the margin position of the sub-pixel to be measured based on the gray information on the image if the chromatic value at the margin position of the sub-pixel unit to be measured is out of a predetermined chromatic value range.

In an exemplary embodiment of the disclosure, the predetermined chromatic value range includes the chromatic value of the sub-pixel unit to be measured.

In an exemplary embodiment of the disclosure, the processor is configured to obtain the margin position of the sub-pixel to be measured based on a corresponding relation between a gray value and a position coordinate of the image.

In an exemplary embodiment of the disclosure, the processor is configured to calculate a distance between margin positions of opposite margins of the sub-pixel to be measured to obtain the critical dimension of the sub-pixel to be measured.

DETAILED DESCRIPTION OF PREFERRED EMBODIMENTS OF THE INVENTION

Embodiments of the disclosure will be clearly and completely described hereinafter with reference the accompanying drawings in exemplary embodiments of the disclosure. Obviously, the described embodiments are merely part of the embodiments of the disclosure, rather than all of the embodiments of the disclosure. Based on the embodiments of the disclosure, all other embodiments made by those skilled in the art without any inventive steps will fall within the scope of the disclosure.

Figure 1:
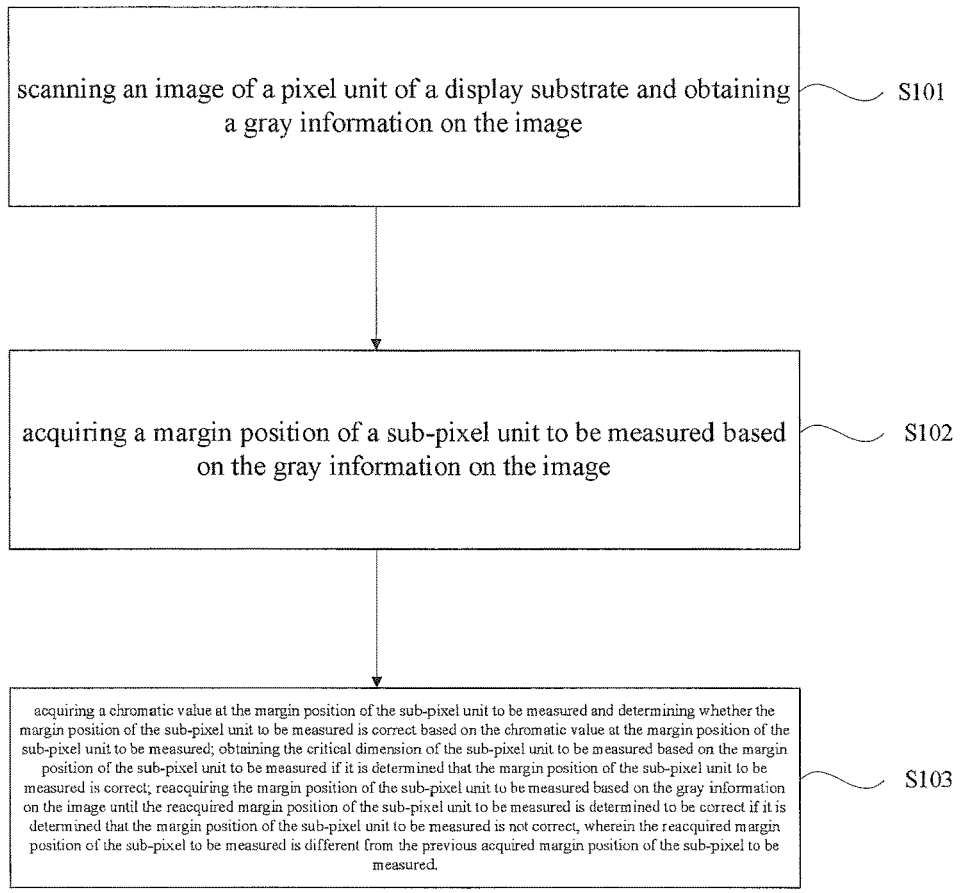
FIG. 1 is a flow chart of a method for measuring a critical dimension of a sub-pixel unit according to an exemplary embodiment of the disclosure.
Figure 2:
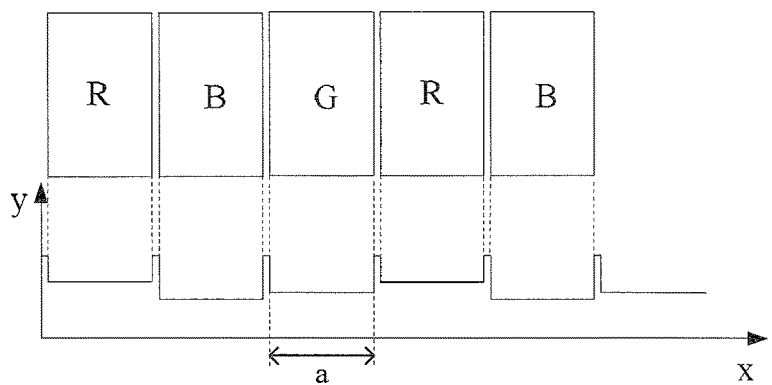
FIG. 2 is schematic view of a corresponding relation between a gray value and a position coordinate of a scanning image according to an exemplary embodiment of the disclosure.
Figure 3:
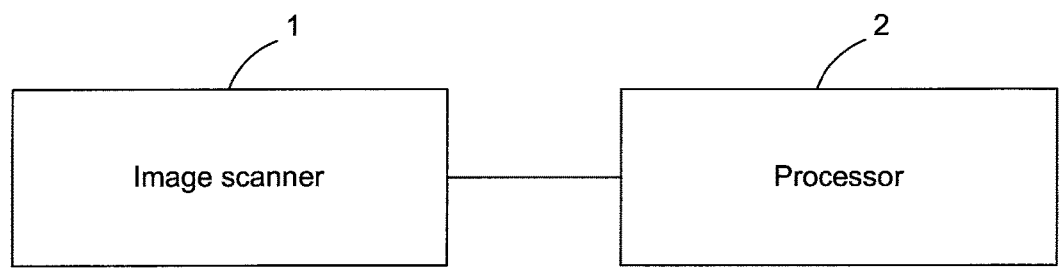
FIG. 3 is a schematic structural view of a measurement device of a sub-pixel unit according to an exemplary embodiment of the disclosure.

Please refer to FIGS. 1, 2 and 3.

As shown in FIG. 1, a method for measuring a critical dimension of a sub-pixel unit according to an exemplary embodiment of the disclosure comprises:

step S101, scanning an image of a pixel unit of a display substrate and obtaining a gray information on the image;

step S102, acquiring a margin position of a sub-pixel unit to be measured based on the gray information on the image;

step S103, acquiring a chromatic value at the margin position of the sub-pixel unit to be measured and determining whether the margin position of the sub-pixel unit to be measured is correct based on the chromatic value at the margin position of the sub-pixel unit to be measured;

obtaining the critical dimension of the sub-pixel unit to be measured based on the margin position of the sub-pixel unit to be measured if it is determined that the margin position of the sub-pixel unit to be measured is correct;

reacquiring the margin position of the sub-pixel unit to be measured based on the gray information on the image until the reacquired margin position of the sub-pixel unit to be measured is determined to be correct if it is determined that the margin position of the sub-pixel unit to be measured is not correct, and then obtaining the critical dimension of the sub-pixel unit to be measured based on the margin position of the sub-pixel unit to be measured which is determined to be correct.

A method for measuring a critical dimension of a pixel unit of a color filter according to an exemplary embodiment of the disclosure comprises: firstly acquiring a margin position of a sub-pixel to be measured in a display substrate based on a gray information on an image within a region of the sub-pixel, then determining whether the margin position of the sub-pixel unit to be measured is correct through analyzing a chromatic value at the margin position of the sub-pixel unit to be measured, i.e., determining whether the margin position is a margin position of the pixel unit as an original measured target or not; if it is determined that the margin position is the margin position of the pixel unit as the original measured target, calculating the critical dimension of the sub-pixel unit to be measured based on the margin position; if it is determined that the margin position is not the margin position of the pixel unit as the original measured target, re-determining the margin position of the sub-pixel to be measured based on the gray information and the this acquired margin position.

Compared with the traditional method for calculating the critical dimension of the sub-pixel unit to be measured by directly using the margin position of the sub-pixel unit to be measured after acquiring the margin position based on the gray information, the method for measuring the critical dimension of the pixel unit of the color filter based on the disclosure increases the step of determining the acquired margin position, and only when the determining result is YES, this margin position can be used to calculate the critical dimension of the sub-pixel unit to be measured. Therefore, the critical dimension of the sub-pixel unit to be measured obtained by the method for measuring the critical dimension of the pixel unit of the color filter according to the disclosure is more accurate. Thus, the method for measuring the critical dimension can improve accuracy for measuring the critical dimension of the pixel unit.

In a preferable embodiment, in the step S101, when scanning the image of the pixel unit of the display substrate, it is possible to only scan the image of a small range region including the sub-pixel unit to be measured in the display substrate. Specifically, it is possible to only scan the image of the color filter in the display substrate.

Further, in a specific embodiment, the gray information on the image in the step S102 may be a corresponding relation between a gray value and a position coordinate of the image. Alternatively, the above corresponding relation may be a curve of a change in the gray value in an arranging direction of the respective pixel units in a pixel.

Further, the step S102 may specifically comprises: performing a graying process, a denoising process and the like on the image, and then detecting the gray value of the image and obtaining the curve of the corresponding relation between the gray value and the position coordinate. Since a black matrix region is located outside the margin of the sub-pixel unit, as shown in FIG. 2, the gray value at the margin position of the sub-pixel unit tends to vary greatly. Furthermore, it is possible to obtain the position coordinate of the sub-pixel unit to be measured based on an approximate position and a specific numerical value of the change in the gray value of the image of the sub-pixel unit to be measured.

Furthermore, in a specific embodiment, in the step S103, the determining whether the margin position of the sub-pixel unit to be measured is correct based on the chromatic value at the margin position of the sub-pixel unit to be measured specifically comprises: matching the chromatic value at the margin position of the sub-pixel unit to be measured with a predetermined chromatic value range; determining the margin position of the sub-pixel unit to be measured is correct if the chromatic value at the margin position of the sub-pixel unit to be measured is within the predetermined chromatic value range; determining the margin position of the sub-pixel unit to be measured is not correct if the chromatic value at the margin position of the sub-pixel unit to be measured is out of the predetermined chromatic value range. Preferably, the predetermined chromatic value range includes the chromatic value of the sub-pixel unit to be measured. Specifically, the predetermined chromatic value range may be determined based on the chromatic value of the pixel unit to be measured and the chromatic value of a sub-pixel unit adjacent thereto.

Further, in the step S103, if it is determined that the margin position of the sub-pixel unit to be measured is not correct, reacquiring the margin position of the sub-pixel unit in a region between the margin position of the previous sub-pixel unit to be measured and the sub-pixel unit to be measured based on the gray information on the image until the acquired margin position of the sub-pixel unit to be measured is determined to be correct. Specifically, if the chromatic value at the margin position of the sub-pixel unit to be measured is out of the predetermined chromatic value range, re-finding and reacquiring the margin position of the sub-pixel unit to be measured in a region between the margin position of the previous sub-pixel unit to be measured and the sub-pixel unit to be measured based on the curve of the corresponding relation between the gray value and the position coordinate, and then determining whether the reacquired margin position of the sub-pixel unit to be measured is correct based on the chromatic value range at the reacquired margin position of the sub-pixel unit to be measured; if it is determined that the reacquired margin position of the sub-pixel unit to be measured is correct, calculating the critical dimension of the sub-pixel unit to be measured based on the reacquired margin position of the sub-pixel unit to be measured; if it is determined that the reacquired margin position of the sub-pixel unit to be measured is not correct, re-finding and reacquiring the margin position of the sub-pixel unit to be measured in the region between the reacquired margin position of the sub-pixel unit to be measured and the sub-pixel unit to be measured based on the curve of the corresponding relation between the gray value and the position coordinate and repeating this operation until it is determined that the finally acquired margin position of the sub-pixel unit to be measured is correct based on the chromatic value thereof. At this time, the critical dimension of the sub-pixel unit to be measured can be calculated based on the finally acquired margin position of the sub-pixel unit to be measured.

Furthermore, in a specific embodiment, in the step S103, obtaining the critical dimension of the sub-pixel unit to be measured based on the margin position of the sub-pixel unit to be measured may comprise calculating a distance between margin positions of opposite margins of the sub-pixel unit to be measured, wherein the distance length is the critical dimension of the sub-pixel unit to be measured. Specifically, the critical dimension of this pixel unit can be obtained by subtracting the position coordinates of the opposite margins of the sub-pixel unit to be measured. As shown in FIG. 2, a is the critical dimension of the sub-pixel unit G.

Embodiments of the disclosure also provide a measurement device for a critical dimension of a sub-pixel unit. As shown in FIG. 3, the measurement device comprises:

an image scanner 1 configured to scan an image of a pixel unit of a display substrate and obtain a gray information on the image; and a processor 2 configured to:
acquire a margin position of a sub-pixel unit to be measured based on the gray information on the image;
acquire a chromatic value at the margin position of the sub-pixel unit to be measured and determine whether the margin position of the sub-pixel unit to be measured is correct based on the chromatic value at the margin position of the sub-pixel unit to be measured;

obtain the critical dimension of the sub-pixel unit to be measured based on the margin position of the sub-pixel unit to be measured if it is determined that the margin position of the sub-pixel unit to be measured is correct;

reacquire the margin position of the sub-pixel unit to be measured based on the gray information on the image until the acquired margin position of the sub-pixel unit to be measured is determined to be correct if it is determined that the margin position of the sub-pixel unit to be measured is not correct, and then obtaining the critical dimension of the sub-pixel unit to be measured based on the margin position of the sub-pixel unit to be measured which is determined to be correct.

In a preferable embodiment, when scanning an image of a color filter substrate using the image scanner 1, it is possible to only scan the image of a small range region including the sub-pixel unit to be measured in the color filter substrate. Specifically, it is possible to only scan the image of the color filter in the display substrate.

Further, in a specific embodiment, the processor 2 can performed a graying process, a denoising process and the like to the image, and then detect the gray value of the image and obtain a curve of a corresponding relation between the gray value and the position coordinate. Alternatively, the above corresponding relation may be a curve of a change in the gray value in an arranging direction of the respective pixel units in a pixel. As shown in FIG. 2, the x-axis represents the position coordinate in the arranging direction of the respective pixel units in the pixel, and the y-axis represents the chromatic value. Since a black matrix region is located outside the margin of the sub-pixel unit, as shown in FIG. 2, the gray value at the margin position of the sub-pixel unit tends to change greatly. Furthermore, the processor 2 can obtain the position coordinate of the sub-pixel unit to be measured based on an approximate position in the x-axis and a specific numerical value of the change in the gray value of the image of the sub-pixel unit to be measured.

Furthermore, in a specific embodiment, the processor 2 can also acquire the chromatic value at the margin position of the sub-pixel unit to be measured in the image and match the chromatic value at the margin position of the sub-pixel unit to be measured with a predetermined chromatic value range; if the chromatic value at the margin position of the sub-pixel unit to be measured is within the predetermined chromatic value range, the processor 2 will obtain the critical dimension of the sub-pixel to be measured based on the margin position of the sub-pixel unit to be measured; if the chromatic value at the margin position of the sub-pixel unit to be measured is out of the predetermined chromatic value range, the processor 2 will require the margin position of the sub-pixel to be measured in a region between the margin position of the previous sub-pixel unit to be measured and the sub-pixel unit to be measured based on the curve of the corresponding relation between the gray value and the position coordinate. Preferably, the predetermined chromatic value range includes the chromatic value of the sub-pixel unit to be measured. Specifically, the predetermined chromatic value range may be determined based on the chromatic value of the pixel unit to be measured and the chromatic value of a sub-pixel unit adjacent thereto.

Further, if the chromatic value at the margin position of the sub-pixel unit to be measured is out of the predetermined chromatic value range, the processor 2 can re-find and reacquire the margin position of the sub-pixel unit to be measured in the region between the margin position of the previous sub-pixel unit to be measured and the sub-pixel unit to be measured based on the curve of the corresponding relation between the gray value and the position coordinate, and then determine whether the reacquired margin position of the sub-pixel unit to be measured is correct based on the chromatic value range at the reacquired margin position of the sub-pixel unit to be measured; if it is determined that the reacquired margin position of the sub-pixel unit to be measured is correct, the processor 2 calculates the critical dimension of the sub-pixel unit to be measured based on the reacquired margin position of the sub-pixel unit to be measured; if it is determined that the reacquired margin position of the sub-pixel unit to be measured is not correct, the processor 2 re-finds and reacquires the margin position of the sub-pixel unit to be measured in the region between the reacquired margin position of the sub-pixel unit to be measured and the sub-pixel unit to be measured based on the curve of the corresponding relation between the gray value and the position coordinate and repeats this operation until it is determined that the finally acquired margin position of the sub-pixel unit to be measured is correct based on the chromatic value thereof. At this time, the critical dimension of the sub-pixel unit to be measured can be calculated based on the finally acquired margin position of the sub-pixel unit to be measured.

Furthermore, the information process unit 2 may obtain the critical dimension of the sub-pixel unit to be measured by calculating a distance between margin positions of opposite margins of the sub-pixel unit to be measured. Specifically, the processor 2 may obtain the critical dimension by subtracting the position coordinates of the opposite margins of the sub-pixel unit to be measured. As shown in FIG. 2, a is the critical dimension of the sub-pixel unit G.

Obviously, it would be appreciated by those skilled in the art that various changes or modifications may be made to the embodiments of the present disclosure without departing from the principle and spirit thereof. In this way, if these changes or modifications to the embodiments of the present disclosure fall within the scope defined in claims and their equivalents of the present disclosure, the embodiments of the present disclosure are intended to cover these changes or modifications.

What is claimed is:

1. A method for measuring a critical dimension of a sub-pixel comprising the steps of:

scanning an image of a pixel unit of a display substrate and obtaining a gray information on the image with an image scanner;

using a processor to perform steps of:

acquiring margin positions of a sub-pixel unit to be measured, which are opposite to each other, based on the gray information on the image;

acquiring a chromatic value at the margin position of the sub-pixel unit to be measured with a chromameter and determining whether the margin position of the sub-pixel unit to be measured is correct based on the chromatic value at the margin position of the sub-pixel unit to be measured;

obtaining the critical dimension of the sub-pixel unit to be measured based on a difference between margin positions of the sub-pixel unit to be measured if it is determined that the margin position of the sub-pixel unit to be measured is correct;

reacquiring the margin position of the sub-pixel unit to be measured based on the gray information on the image until the reacquired margin position of the sub-pixel unit to be measured is determined to be correct if it is determined that the margin position of the sub-pixel unit to be measured is not correct, and then obtaining the critical dimension of the sub-pixel unit to be measured based on the margin position of the sub-pixel unit to be measured which is determined to be correct, the step of determining whether the margin position of the sub-pixel unit to be measured is correct based on the chromatic value at the margin position of the sub-pixel unit to be measured comprises;

comparing the chromatic value at the margin position of the sub-pixel unit to be measured with a predetermined chromatic value range;

determining the margin position of the sub-pixel unit to be measured is correct if the chromatic value at the margin position of the sub-pixel unit to be measured is within the predetermined chromatic value range;

determining the margin position of the sub-pixel unit to be measured is not correct if the chromatic value at the margin position of the sub-pixel unit to be measured is out of the predetermined chromatic value range.

2. The method according to claim 1, the step of reacquiring the margin position of the sub-pixel unit to be measured based on the gray information on the image comprises: reacquiring the margin position of the sub-pixel to be measured in a region between the previous acquired margin position of the sub-pixel to be measured and the sub-pixel to be measured based on the gray information on the image.

3. The method according to claim 1, wherein the predetermined chromatic value range includes the chromatic value of the sub-pixel unit to be measured.

4. The method according to claim 1, wherein the gray information on the image is a corresponding relation between a gray value and a position coordinate of the image.

5. The method according to claim 4, the step of obtaining the critical dimension of the sub-pixel unit to be measured based on the margin position of the sub-pixel unit to be measured comprises:

calculating a distance between margin positions of opposite margins of the sub-pixel to be measured, wherein a length of the distance is the critical dimension of the sub-pixel to be measured.

6. A measurement device for a critical dimension of a sub-pixel comprising:

an image scanner configured to scan an image of a pixel unit of a display substrate and obtain a gray information on the image; and a chromameter configured to measure a chromatic value at a margin position of the sub-pixel unit to be measured, a processor configured to:

acquire a margin position of the sub-pixel unit to be measured based on the gray information on the image;

acquire a chromatic value at the margin position of the sub-pixel unit to be measured and determine whether the margin position of the sub-pixel unit to be measured is correct based on the chromatic value at the margin position of the sub-pixel unit to be measured;

obtain the critical dimension of the sub-pixel unit to be measured based a difference between the margin positions of the sub-pixel unit to be measured if it is determined that the margin position of the sub-pixel unit to be measured is correct;

reacquire the margin position of the sub-pixel unit to be measured based on the gray information on the image until the reacquired margin position of the sub-pixel unit to be measured is determined to be correct if it is determined that the margin position of the sub-pixel unit to be measured is not correct, and then obtaining the critical dimension of the sub-pixel unit to be measured based on the margin position of the sub-pixel unit to be measured which is determined to be correct, wherein the processor is configured to:

compare the chromatic value at the margin position of the sub-pixel unit to be measured with a predetermined chromatic value range;

obtain the critical dimension of the sub-pixel to be measured based on the margin position of the sub-pixel to be measured if the chromatic value at the margin position of the sub-pixel unit to be measured is within a predetermined chromatic value range; and reacquire margin positions of the sub-pixel to be measured, which are opposite to each other, based on the gray information on the image if the chromatic value at the margin position of the sub-pixel unit to be measured is out of a predetermined chromatic value range.

7. The measurement device according to claim 6, wherein the processor is configured to reacquire the margin position of the sub-pixel to be measured in a region between the previous acquired margin position of the sub-pixel to be measured and the sub-pixel to be measured based on the gray information on the image until the reacquired margin position of the sub-pixel unit is determined to be correct if it is determined that the margin position of the sub-pixel to be measured is not correct.

8. The measurement device according to claim 6, wherein the predetermined chromatic value range includes the chromatic value of the sub-pixel unit to be measured.

9. The measurement device according to claim 6, wherein the processor is configured to obtain the margin position of the sub-pixel to be measured based on a corresponding relation between a gray value and a position coordinate of the image.

10. The measurement device according to claim 9, wherein the processor is configured to calculate a distance between two opposite margin positions of the sub-pixel to be measured to obtain the critical dimension of the sub-pixel to be measured.

* * * * *